United States Patent [19]
Franco et al.

[11] Patent Number: 5,209,282
[45] Date of Patent: May 11, 1993

[54] VERTICAL BLIND WITH CORRUGATED SURFACE

[75] Inventors: Giovanni Franco, Montreal; Angelo Cianci, Ste-Dorothée, both of Canada

[73] Assignee: Extrusiovinyl & Plastics Co., Inc., Laval, Canada

[21] Appl. No.: 312,049

[22] Filed: Feb. 14, 1989

[30] Foreign Application Priority Data

Nov. 29, 1988 [CA] Canada ............................ 584426

[51] Int. Cl.$^5$ .............................................. E06B 3/12
[52] U.S. Cl. ................................................... 160/236
[58] Field of Search .............. 160/236, 168.1, 178.1, 160/172, 166.1, 900

[56] References Cited

U.S. PATENT DOCUMENTS

| | | | |
|---|---|---|---|
| 2,103,788 | 12/1937 | Mohrfeld | 160/236 |
| 2,146,816 | 2/1939 | Grassby | 160/178.1 |
| 2,209,355 | 7/1940 | Schmitz | 160/236 X |
| 3,122,954 | 3/1964 | Nadosy | 160/166.1 X |
| 3,645,317 | 2/1972 | Malone | 160/236 X |
| 4,128,386 | 12/1978 | Wissinger et al. | |
| 4,336,834 | 6/1982 | Schaller | 160/168.1 |
| 4,398,587 | 8/1983 | Boyd | 160/236 X |
| 4,773,733 | 9/1988 | Murphy et al. | 160/236 X |
| 4,799,526 | 1/1989 | Reeves | 160/168.1 |

FOREIGN PATENT DOCUMENTS

| | | |
|---|---|---|
| 57-105704 | 7/1982 | Japan . |
| 62-240527 | 10/1987 | Japan . |
| 62-248626 | 10/1987 | Japan . |

*Primary Examiner*—David M. Purol
*Attorney, Agent, or Firm*—Oblon, Spivak, McClelland, Maier & Neustadt

[57] ABSTRACT

There is disclosed a blind slat to be used particularly for vertical blinds wherein at least the outer surface is formed with regularly distributed successive corrugations. In practice, the inner face is also corrugated. The slat is extruded from a plastic material of one basic color and preselected opposite surfaces forming the corrugations are of a color which is different from the basic color. Some or all of the remaining opposite surfaces have the basic color or a color which different from the basic color and from the color of the preselected opposite surfaces. Such blind slat is particularly useful to create special effects for example by vertical blinds. The method and the apparatus for producing these blind slats are also disclosed.

2 Claims, 4 Drawing Sheets

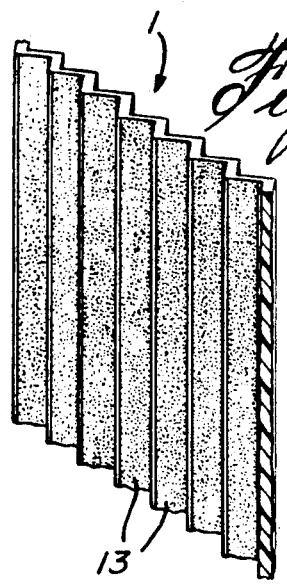
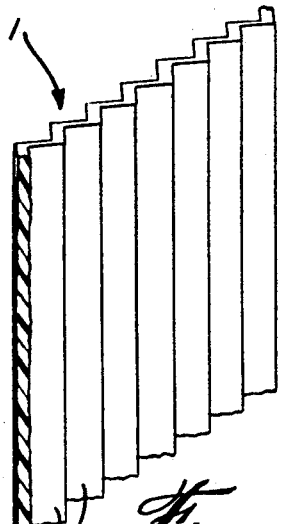
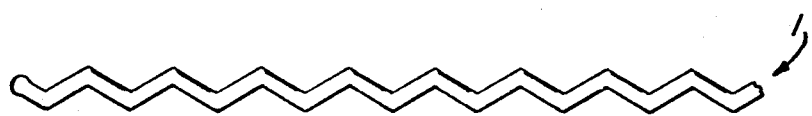
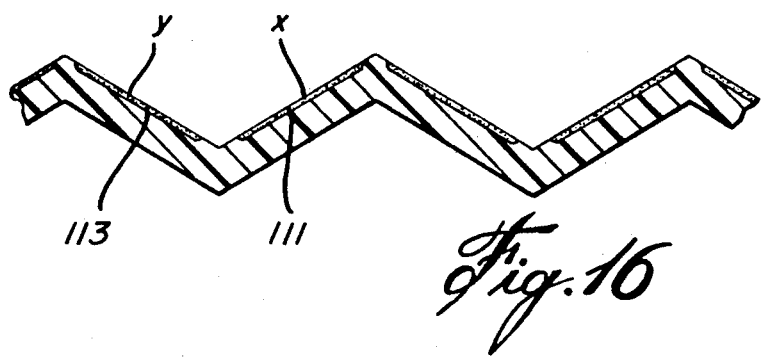

VERTICAL BLIND WITH CORRUGATED SURFACE

BACKGROUND OF INVENTION a) Field of the Invention

The invention relates to a blind slat having a corrugated surface. More particularly, the present invention is concerned with a corrugated vertical blind slat in which preselected slanted surfaces forming the corrugations have a specific color which is different from the remaining slanted surfaces, thereby enabling to produce special visual effects, especially upon rotation of the vertical blind slat. The invention additionally relates to a method and an apparatus for manufacturing the above-mentioned blind slat.

b) Description of Prior Art

Vertical and horizontal blind slats have been known for a long time. Today, they are normally produced by extrusion through a die in a large variety of choice. There is the standard flat slat whose color depends on the color of the plastic material which is used for its manufacture. Also, there are blind slats in which the outer surfaces are formed of a wide variety of patterns which are obtained by extrusion, molding, coating or otherwise.

In the field of decoration, it is known that color effects are very important. On the other hand, since vertical and horizontal blinds are used etensively for commercial and residential decoration, there is a need for blinds which offer not only a choice of patterns but also enable to blend in a color scheme or produce special effects through the use of colors. To our knowledge, there is no blind slat which permits to achieve the above goal.

U.S. Pat. No. 4,336,834 discloses a Venetian blind in which the slats have a selected color on one face and a different color on the reverse face. U.S. Pat. No. 4,128,386 discloses a process for extruding patterned sheets or panels of differently colored thermoplastic synthetic resin which enables to achieve a uniform distribution of the individual colored compositions. Japanese 87-337189/48 describes the coextrusion of two resins to obtain a laminated sheet of superior decorative effect. Japanese 87-345090/49 discloses the coextrusion of two materials of different colors to produce a filmy material with special effect. Japanese 57-105704 describes the production of homogeneous products having various optical properties depending upon direction.

However, as far as we know, the art is silent with respect to blind slats which permit special effects through the use of color.

SUMMARY OF INVENTION

It is therefore an object of the present invention to provide a blind slat which though the combined effect of a corrugated surface and preselected color distribution on its surface, enables to obtain special visual or decorative effects.

It is another object of the present invention to provide a method and an apparatus for the production of the above-mentioned blind slat.

In acccordance with the invention, there is provided a blind slat having an inner and an outer surface, at least the outer surface being formed with regularly distributed successive corrugations, each corrugation comprising a pair of preferably oppositely inclined slanted, surfaces defining ridges and hollows on the outer surface, the ridges and hollows being joined by the opposite surfaces, the ridges, hollows and opposite surfaces extending lengthwise with respect to the slat. Each opposite surface forms a preferably similar angle with respect to a tangent relative to the outer surface. The slat is extruded from a plastic material of one basic color, a number of preselected opposite surfaces have another color which is different from the basic color, and the remaining opposite surfaces have at least one color which is different from the color of the preselected opposite surfaces.

The invention also relates to a method of manufacturing a blind slat as defined above, which comprises the steps of extruding a plastic material of one basic color through an extruder die to form a blind slat provided with at least an outer surface formed with regularly distributed successive corrugations, each corrugation comprising a pair of preferably oppositely inclined slanted, surfaces defining ridges and hollows, the ridges and hollows being joined by the opposite surfaces, and extruding a plastic material of at least one different color through a plurality of feed channels to direct a plurality of jets of a plastic material of at least one different color against preselected opposite surfaces of the blind slat, to form a blind slat with a number of preselected opposite surfaces having at least the one different color, the remaining opposite surfaces, if any, having the basic color.

According to the invention, there is also provided an extrusion die for manufacturing blind slats provided with at least an outer surface formed with regularly successive corrugations, each corrugation comprising a pair of preferably oppositely inclined slanted, surfaces defining ridges and hollows, the ridges and hollows being joined by the opposite surfaces. The die comprises an extruder shaped to form the blind slats provided with corrugations, means for feeding a plastic material of one basic color through the extruder, the extruder comprising a plurality of feed channels which are substantially perpendicular to the direction of feed of the plastic material but oriented toward preselected opposite surfaces, and means for feeding at least one plastic material of a color which is different from the basic color through the feed channels.

BRIEF DESCRIPTION OF DRAWINGS

The invention is illustrated by means of the annexed drawings, given only as examples, but is not restricted thereto. In the drawings which illustrate the invention.

FIG. 12 is a view of a blind slat according to the invention rotated to show the colored faces only;

FIG. 13 is a view similar to FIG. 12 showing the faces of another color;

FIG. 14 is a schematic cross-section view of a blind slat according to the invention which is slightly curved;

FIG. 15 is a view similar to FIG. 14 showing a perfectly flat blind slat; and

FIG. 16 is a cross-section view on an enlarged scale showing how the colored plastic material is applied on the slat.

DESCRIPTION OF PREFERRED EMBODIMENTS

Figure 6:
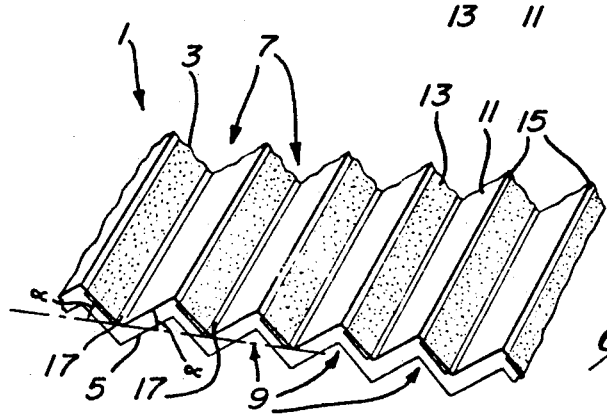
FIG. 6 is a perspective view showing a blind slat according to the invention.
Figure 5:
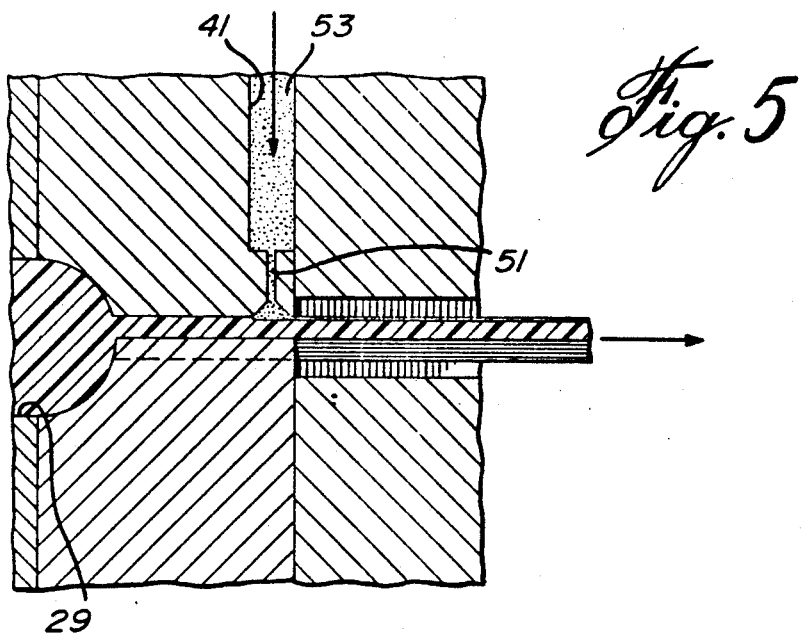
FIG. 5 is a cross-section view in elevation showing the same application of colored plastic as in FIG. 4.

With reference to the drawings, more particularly FIG. 6, it will be seen that a blind slat 1 according to the invention is corrugated. In other words, its outer face 3 as well as its inner (reverse) face 5 are formed with regularly distributed successive corrugations 7, on the outer face 3 and 9, on the inner face 5. As shown in the drawings the corrugations 7 and 9 have the same general configuration, and the corrugations 9 on the inner face 5 are off set with respect to the configurations 7 on the outer face 3.

Since the corrugations 7 and 9 are generally similar, the detailed description will be restricted to corrugation 7. Each configuration 7 comprises a pair of oppositely inclined slanted surfaces 11 and 13 which define ridges 15 and hollows 17 on the outer surface 3. As shown the ridges 15 and hollows 17 are joined by slanted surfaces 11 on one side of the corrugation 7 and by slanted surfaces 13 on the other side thereof. Finally, also as shown, the ridges 15, hollows 17 and slanted surfaces 11 and 13 extend lengthwise with respect to the slat 1. It will also be seen that each slanted surface 11,13 forms the same angle $\alpha$, with respect to a tangent line taken at hollow 17. Although this angle may vary to some extent it has been found preferable to set it at about 45°.

The slat 1 is normally made by extrusion from any suitable plastic material as will be discussed hereinbelow. However, it is obvious that any other suitable method of manufacture would be acceptable provided a slat with the characteristics according to the invention is obtained.

With reference to the embodiment illustrated in FIG. 6, it will be seen that the slat is made of one basic color, for example off white, and that the slanted surfaces 13 are all of the same color which is different from the basic color. An advantage of this arrangement is that when it is directly presented to the eye it gives an attractice decorative pattern mostly consisting of vertical lines. On the other hand, when rotating the slat in one direction, as shown in FIG. 12, only the slanted surfaces 13 will appear and the blind will seem to be entirely of the color given to the slanted surfaces 13. When rotating the slat in opposite direction, as shown in FIG. 13, the blind will seem to be entirely of the basic color. This has been found to be an advantageous possibility when decorating a room.

Another possibility as shown in FIG. 16 of the drawing is to have one specific color x for the slanted surfaces 111, and another specific color y for the slanted surfaces 113. In this case, it will be noted that the two specific colors are different from the basic color of the plastic material used to manufacture the slats. This embodiment offers the same possibility as the previously described embodiment, when rotating the slats, except that two different colors will appear that are not the same as the basic color of the plastic material.

Figure 7:
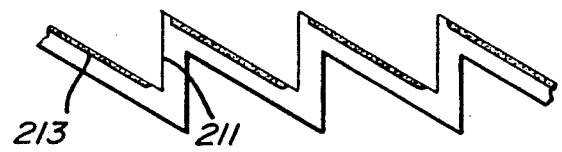
FIGS. 7 to 11 are cross-section views showing alternative constructions of blind slat according to the invention.

Still another possibility is as illustrated in FIG. 7, where slanted face 213 is inclined and colored, while face 211 is vertical, of the same color as the base material and narrower than slanted face 213.

Figure 8:
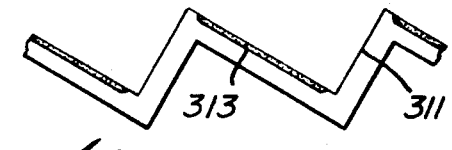

The embodiment illustrated in FIG. 8 is the same as that illustrated in FIG. 6 except that slanted face 311 is narrower than slanted face 313.

Figure 9:

The embodiment illustrated in FIG. 9 shows that slanted face 413 is of different color than slanted face 411, slanted face 413 is wider that slanted 411, and face 413 is concave while face 411 is convex.

Figure 10:
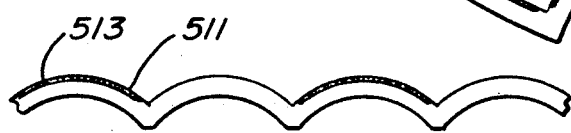

Another possibility is shown in FIG. 10, wherein faces 511 and 513 merge into one another to form a round face, wherein the color may change from one round face to the other.

Figure 11:
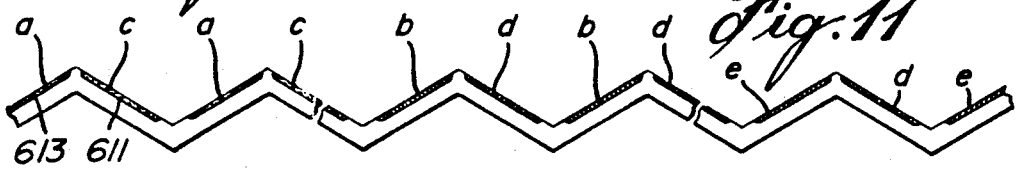

In FIG. 11, it is shown that it is possible to have a combination of 5 or more different colors a, b, c, d and e.

A slat according to the invention can be produced with a curve as shown in FIG. 14 or perfectly as shown in FIG. 15.

The method used to manufacture blind slats according to the invention include the following steps. First, a plastic material of one basic color such as off white, beige, etc. is extruded through an extruder die which is shaped to form a blind slat that is corrugated as indicated above, i.e. that has regularly distributed successive corrugations on at least the outer face of the blind slat 1. Of course corrugations may appear on both faces of the slat, as this is cheaper and easier to manufacture. Simultaneously as the plastic material of the basic color is extruded through the extruder die, a plastic material of different color is injected through a plurality of feed channels which direct a plurality of jets of plastic material of different color against preselected preferably slanted surfaces, such as surfaces 13, or any combination of some or all of slanted surfaces 11 and 13.

An extrusion die which may be used to produce the blind slats according to the invention is illustrated in FIGS. 1 to 5. It will be seen that the apparatus consists of a feeder block 19 which is mounted on an extrusion block 21 by means of bolts 23,25 the latter also being used to press a receiver block 27 against the extrusion block 21 all in the manner shown in FIGS. 1 and 2 of the drawings.

Feeder block 19 consists of a rectangular steel member which is formed with a bore 29 intended to constitute the plastic material feed in communication with the orifice 31 of the die defined by the feeder block 19 and the extrusion block 21. Of course, the orifice 31 is formed into a shape intended to give a specific cross-section to the blind slat 1, in this particular case, a corrugated shape, as defined above.

For ease of assembly, the extrusion block 21 is made of an upper part 33 and a lower part 35 which are connected together by means of bolts 37 (shown in dotted lines in FIG. 2) and are cut at their mating edges in a manner to define the orifice 31. While the lower part 35 mainly consists of a rectangular piece of steel with a particular cut at its mating edge with the upper part 33 and a bore 39 to receive the bolt 37, the upper part 33 is more complex and will now be described in detail.

Figure 1:
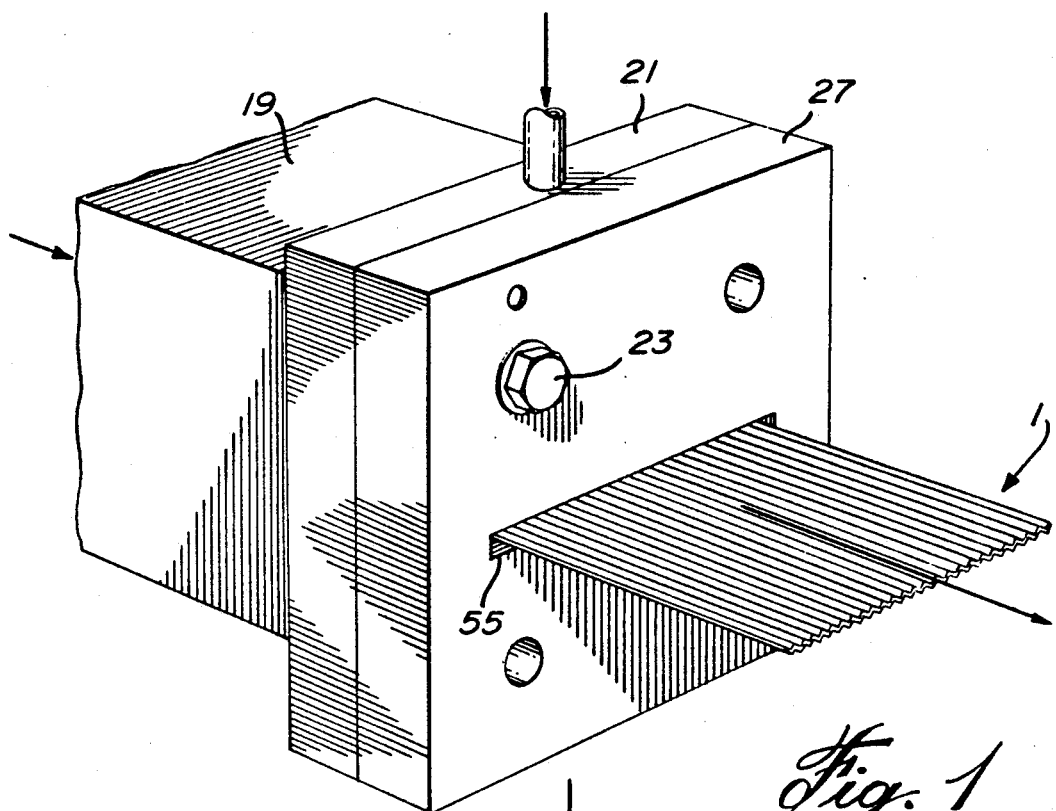
FIG. 1 is a perspective view of a die which can be used to produce blind slats according to the invention.
Figure 2:
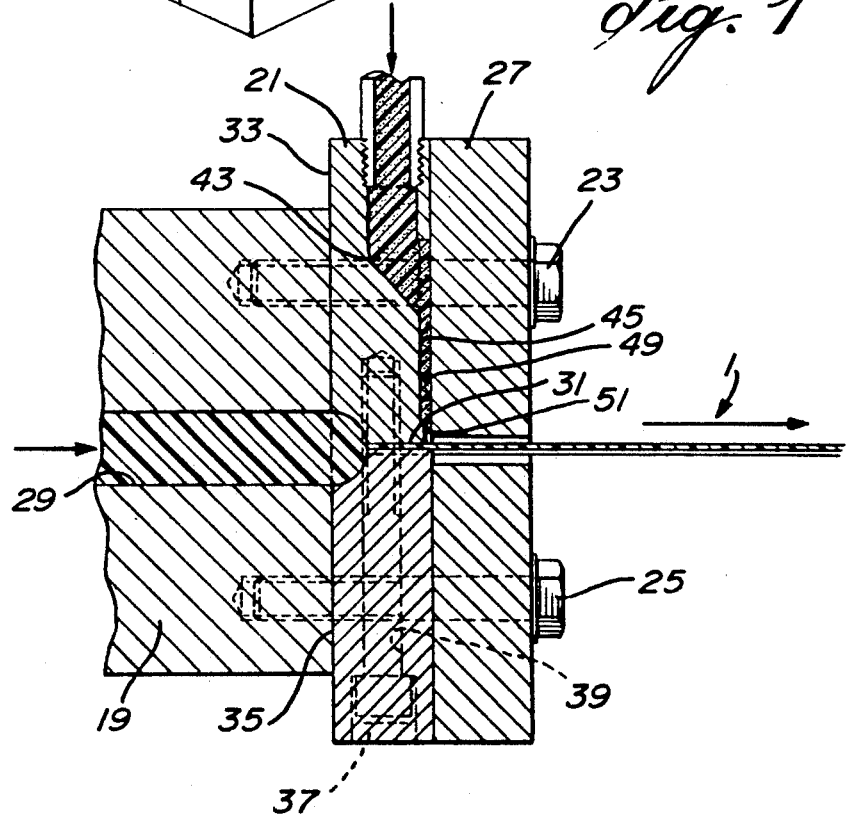
FIG. 2 is a cross-section view in elevation of the die illustrated in FIG. 1.
Figure 3:
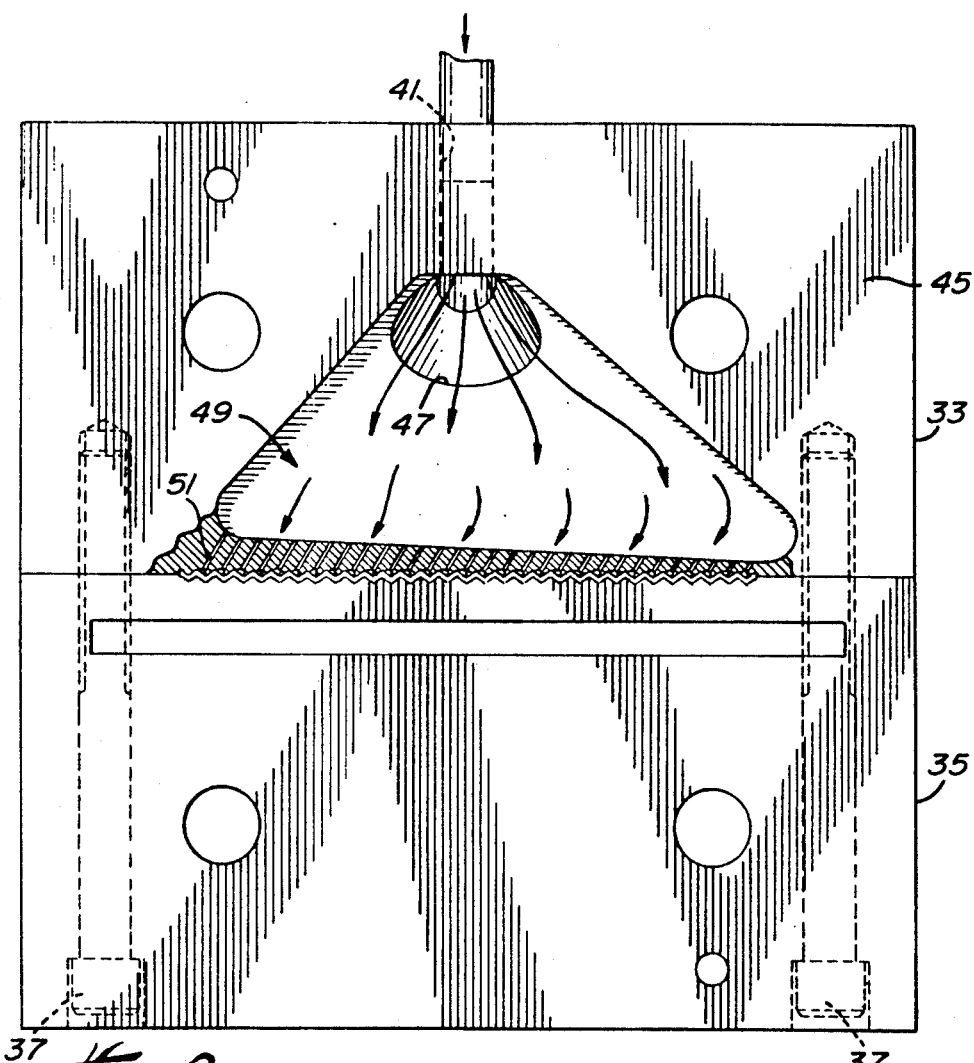
FIG. 3 is a front view of the die with the receiver block removed.
Figure 4:
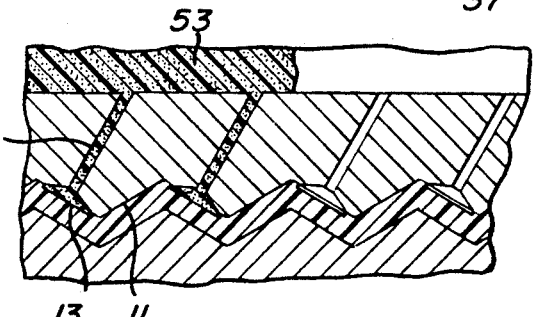
FIG. 4 is a cross-section view showing the application of the colored plastic on the blind slat being extruded.

With reference to FIGS. 1, 2 and 3, it will be seen that the upper part 33 of the extrusion block 21 is formed with a vertical bore 41 extending from the top edge thereof to a point 43 in the upper middle portion of the upper part 33 where it turns toward face 45 thereof where it forms an outlet 47 into an inner space 49 defined by triangular depression formed in the face 45 of the upper part 33. As shown in FIGS. 2 and 3, the inner space 49 is in communication with a series of channels 51 formed through the upper part 33 and in communication with the orifice 31. With particular reference to FIG. 3, it will be seen that the depression forming the inner space 49 is slightly tilted clockwise. This is to permit to have channels 51 whose length decreases from left to right. Furthermore, the outlet 47 into the inner space is slightly off centered. This combination enables to obtain a regular distribution of the colored plastic 53 (FIG. 4) onto slanted face 13 of the blind slat 1 being extruded. As particular shown in FIG. 4, the outlet 55 of each channel 51 is tapered to provided a clear and neat application of the colored plastic 53 on the slanted faces 13. As particularly shown in FIGS. 2, 3 and 4 the channels 51 are perpendicular to the direction of travel of the extruded slat 1 but are slightly inclined as shown in FIG. 4 and perpendicularly oriented towards the slanted faces 13. Of course any other arrangement is possible according to the invention, it being understood that it is merely necessary to modify the disposition, number and arrangement of channels 51. Finally, it will be observed that the receiving block 27 is formed with an opening 55 through which the blind slat 1 exits after having been extruded and being applied with a colored plastic material on some or all its slanted faces.

It is of course possible to apply additional plastic material of different colors. It would merely be necessary to use an extruder block 21 which has a succession of a plurality of upper parts 33, as will readily be apparent to anyone skilled in the art.

Although the blind slat according to the invention can have various dimensions, in practice, it has been found that the invention is mostly applicable to slats 1 to 12 inches wide and 0.020 to 0.040 thick. Any other method to produce the desired result is within the spirit of the invention such as painting strips of different colors, or the like.

We claim:

1. A blind slat having an inner and an outer surface, at least the outer surface being formed with regularly distributed successive corrugations, each corrugation comprising a pair of oppositely inclined surfaces defining ridges and hollows on said outer surface, said ridges and said hollows being joined by said oppositely inclined surfaces, said ridges, said hollows and said oppositely inclined surfaces extending lengthwise with respect to said slat, each oppositely inclined surface forming a similar angle with respect to a tangent relative to said outer surface, said oppositely inclined surfaces essentially intersecting one another at said hollows, said slat being extruded from a plastic material of one basic color, every similarly inclined slanted surface having another color which is different from said basic color, the remaining slanted surfaces and the outer surface of said slat having said one basic color.

2. A blind slat having an inner and an outer surface, at least the outer surface being formed with regularly distributed successive corrugations, each corrugation comprising a pair of oppositely inclined surfaces defining ridges and hollows on said outer surface, said ridges and said hollows being joined by said oppositely inclined surfaces, said ridges, said hollows and said oppositely inclined surfaces extending lengthwise with respect to said slat, each oppositely inclined surface forming a similar angle with respect to a tangent relative to said outer surface, said oppositely inclined surfaces essentially intersecting one another at said hollows, said slat being extruded from a plastic material of one basic color, every similarly inclined slanted surface having another color, the remaining slanted surfaces having color which is different from said another color and said basic color.

* * * * *